A. WICKSTROM AND C. A. BORGSTROM.
SPRING WHEEL FOR VEHICLES.
APPLICATION FILED SEPT. 3, 1918.
1,304,007.
Patented May 20, 1919.
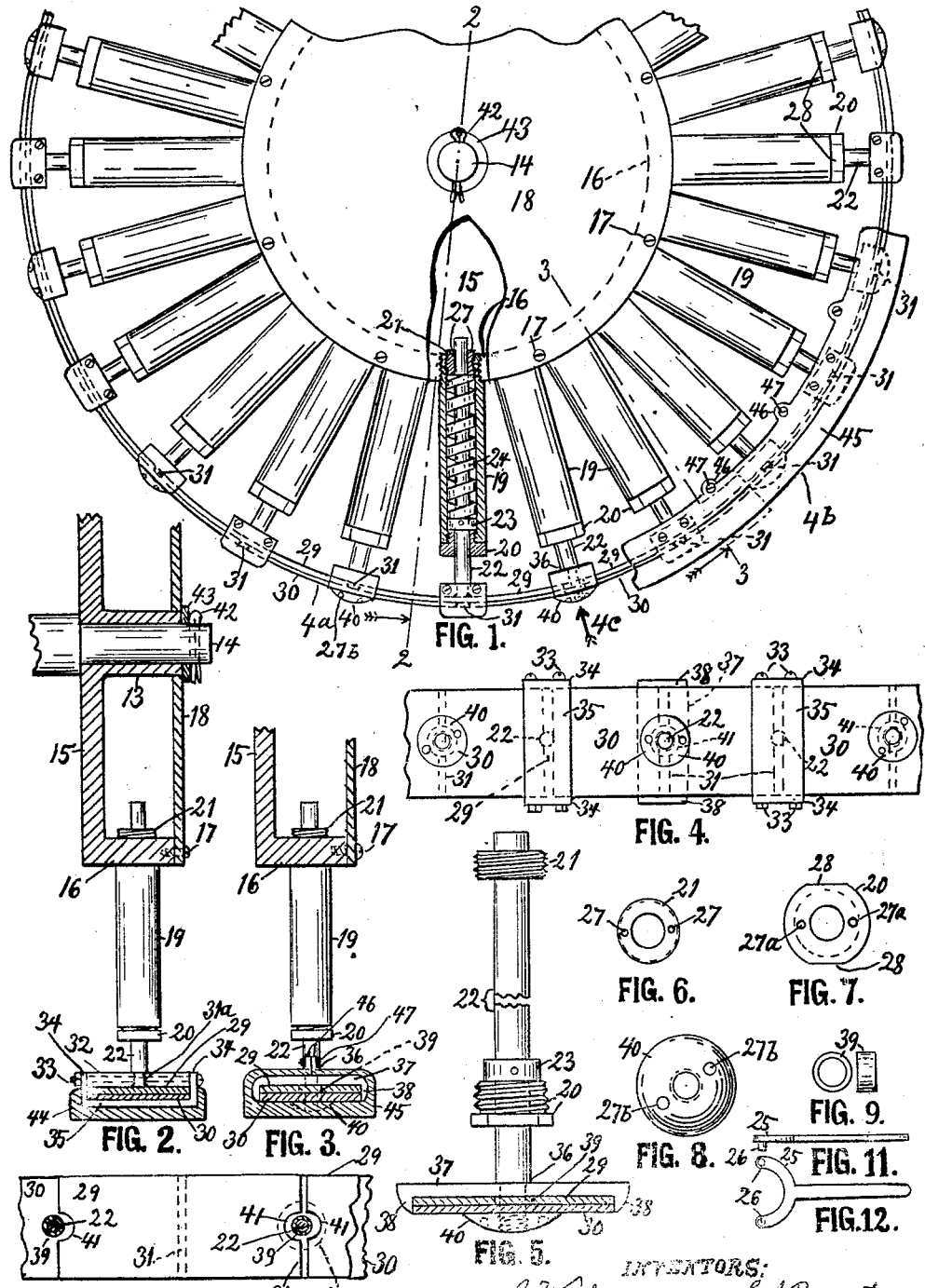

UNITED STATES PATENT OFFICE.

ALFRED WICKSTROM AND CARL A. BORGSTROM, OF MINNEAPOLIS, MINNESOTA.

SPRING-WHEEL FOR VEHICLES.

1,304,007.　　　　Specification of Letters Patent.　　Patented May 20, 1919.

Application filed September 3, 1918. Serial No. 252,352.

*To all whom it may concern:*

Be it known that we, ALFRED WICKSTROM and CARL A. BORGSTROM, subjects of the King of Sweden, residing at Minneapolis, in the county of Hennepin and State of Minnesota, have invented a new and useful Spring-Wheel for Vehicles, of which the following is a specification.

This invention relates to improvements in spring wheels for automobiles and other vehicles; and the object is to provide an efficient and practical vehicle wheel in which springs act as a substitute for a pneumatic tire, and thereby obviates the great troubles resulting from puncturing of pneumatic tires.

In the accompanying drawing, Figure 1 is a partly sectional side elevation of a vehicle wheel embodying our new invention with most of the rubber tire omitted. Fig. 2 is a section on the line 2—2, Fig. 1 with the rubber tire shown in a modified form. Fig. 3 is a section on the line 3—3, Fig. 1. Fig. 4 is a bottom view of a portion of the wheel, as between the points 4ª and 4ᵇ in Fig. 1, looking in the direction of the arrow 4ᶜ, and with the rubber tire omitted. Fig. 5 is a detail cross section of the felly and a side view of one of the outer spoke sections and the collars about the same. Fig. 6 is a top view of the inner collar 21 shown in Fig. 5. Fig. 7 is a bottom view of the outer collar, 20, in Fig. 5. Fig. 8 is a top view of the nut in Fig. 5. Fig. 9 is an end view and a side view of the ring or bushing 39 in Figs. 3 and 5. Fig. 10 is a sectional view on a segmental line close by some of the plates 29 looking radially from the center of the wheel. Fig. 11 is a side view and Fig. 12 is a face view of a special wrench used in assembling and in taking apart the wheel.

Referring to the drawing by reference numerals, 13 designates the hub of the wheel and 14 is any suitable shaft or axle either loose or secured in the hub. The hub is formed with a disk 15 having a concentric rib 16, to which is secured by screws 17 a cover 18, which is fitted upon the hub 13.

Threaded into the rib or rim 16 are tubular spoke sections 19, having each threaded into its outer end a collar 20 and in its inner end a collar 21. Slidably fitted in said collars are spoke sections 22, on each of which is fixed a collar 23, and between said collar and the collar 21 is a partly compressed spring 24 encircling the spoke member 22 and tending at all times to force it away from the center of the wheel; the tension of said spring may be regulated by turning of the threaded collar 21, which turning may be done by a wrench like 25 in Figs. 11 and 12, the studs 26 of the wrench engaging in cavities 27 of the nut (best shown in Fig. 6). The other collar, 20, may also be turned by said wrench 25, 27ª being cavities for the wrench to engage, but the collar is also formed with flat sides 28 for any suitable wrench to engage.

The felly of the wheel is composed of two series of elongated, segmentally bent spring steel plates, 29 and 30, forming respectively an inner and an outer broken ring of plates overlapping and slidable those of one ring on those of the other ring to a limited extent when the felly is slightly bent upward at the point where it contacts with the ground, there being clearance spaces 31 (see Figs. 1 and 10) between the ends of the plates to allow for such bending and sliding movement.

Fixed at 31ª on the outer end of every other of the spoke sections 22 is a metal block or member 32, having holes with two bolts 33 therein; said bolts secure to the block the legs 34 of a ⊔-shaped iron 35, (see Figs. 2 and 4) between which and the member 32 the plates 29 are fitted to slide with their middle portions, and the plates 30 with their end portions. And every other spoke section 22 has its outer end reduced in diameter up to a shoulder 36 (see Fig. 5); said reduced portion is fitted in a metallic member or flat bar 37, having at each end an angular guard 38 reaching across the edges of the plates 29—30.

Upon the said reduced end portion of each spoke is placed a bushing or ring 39, which by a nut 40 is held tightly against the member 37, forcing the latter against the shoulder 36. In the space thus formed between the member 37, guards 38 and nut 40, the ends of the plates 29 are slidable on the middle portions of the plates 30. The ends of the plates 29 are provided with clearance notches 41 (see Fig. 10) for the bushings 39, and the plates 30 may have apertures for said bushings, as in Fig. 3, or preferably, as in Fig. 5, the apertures may be only large enough for the reduced portion of the external spoke member, and the plate 30 may thus be pinched and held between the end of the bushing and the nut 40; the latter nut is provided with cavities 27ᵇ for the wrench 25—26 to engage and turn the nut.

In Fig. 2 42 is a cotter pin and 43 a washer which may be employed to retain the wheel on the shaft 14 when the wheel is rotatable on the shaft. In Fig. 2 44 designates a solid rubber tire of any suitable shape and fastened by any suitable means. But in Figs. 1 and 3 is shown a preferable form 45, which incloses the entire felly and has its inner edges formed with perforated ears 46, which may be secured together by bolts 47, or by suitable lacing, (the latter not shown).

In the operation or use of the wheel, when driving over uneven grounds or in hauling loads, the springs 24 will yield more or less and the lower part of the felly will to that extent vibrate up and down and thus serve the same purpose as a pneumatic tire.

For purpose of oiling the inner spoke section, or for removing and replacing any of the springs 24 it is only necessary to remove the collar 21, and not to remove the tire, felly and collar 20.

What we claim is:—

1. A vehicle wheel having a hub with a disk-like web radiating from one end of it and formed with a circular rib concentric with the hub, a series of tubular spoke sections secured in said rib, a collar threaded into each end of each of said tubular sections, a spoke section slidable in the collars of each tubular section, a collar fixed on the slidable section and a coil spring encircling the said section and partly compressed between the fixed collar and the threaded collar nearest the center of the wheel, and a resilient felly secured to the outer ends of the slidable spoke sections.

2. The structure specified in claim 1, and a detachable cover closing the space between the hub and the circular rib.

3. In a spring wheel for vehicles, a hub section having telescopic spokes, each with a slidable member spring-pressed toward the periphery of the wheel, means for limiting the outward movement of said member, a felly section secured to the outer ends of the slidable spoke members and composed of two circular series of segmental spring steel plates each series slidable on the face of the other series and having its plates slightly spaced apart at their adjacent ends, and, except for said spacing each plate of each series extending practically from the middle of one plate to the middle of the next plate in the other series; every other spoke of said wheel having at its outer end means for loosely embracing and guiding the middle portion of one of the inner plates and the adjacent ends of two plates of the outer series; and means carried by the other spokes for keeping together in circular position the adjacent ends of the plates of the inner series and the middle portions of the plates of the outer series, and means preventing sliding movement of said outer plates relative to said other spokes.

4. The structure specified in claim 3, said outer plates having each a central aperture and the means preventing sliding movement of said plates comprising reduced and partly threaded extensions of the spokes projecting through said apertures, and nuts screwed upon the said threaded ends at the outer sides of the plates.

5. The structure specified in claim 4, and a bushing inserted upon the reduced portion of each spoke so as to prevent said outer plate from pinching the ends of the inner plates, said inner plates having their ends provided with notches adjacent said bushings.

6. The structure specified in 3, and a solid rubber tire channeled so as to fit about the entire felly, and having its edges turned toward the hub of the wheel, and means for detachably securing said edges together along the inner periphery of the felly.

In testimony whereof we affix our signatures.

ALFRED WICKSTROM.
CARL A. BORGSTROM.